July 4, 1967 P. L. JORDAN 3,329,297
SUBMERSIBLE POLYLITHIC VESSEL
Filed July 27, 1964
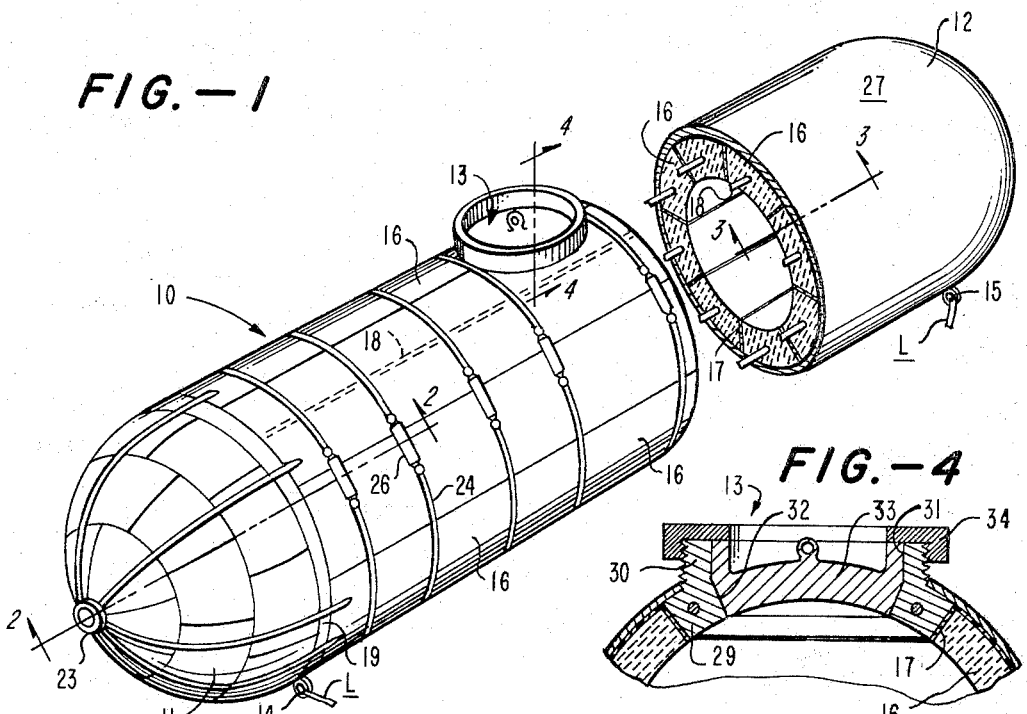
FIG.—1
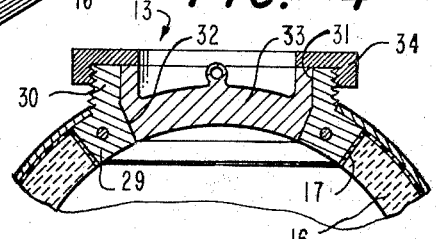
FIG.—4
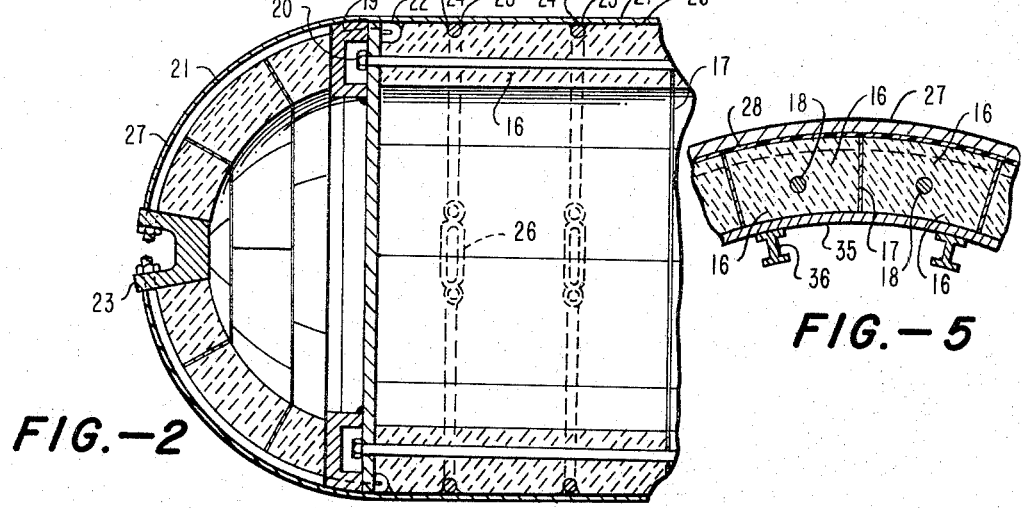
FIG.—2
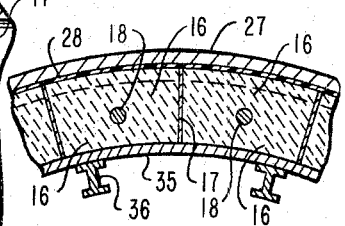
FIG.—5
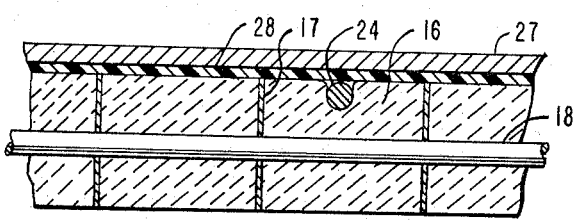
FIG.—3
INVENTOR.
PAUL L. JORDAN
BY William E. Hiller
Edward O. Ansell
ATTORNEYS

United States Patent Office 3,329,297
Patented July 4, 1967

3,329,297
SUBMERSIBLE POLYLITHIC VESSEL
Paul L. Jordan, Altadena, Calif., assignor to Aerojet-General Corporation, Azusa, Calif., a corporation of Ohio
Filed July 27, 1964, Ser. No. 385,148
16 Claims. (Cl. 220—5)

The present invention generally relates to a submersible vessel, such as a submarine, and more particularly to a submersible polylithic vessel capable of withstanding great pressures when submerged in a body of water to extreme depths, wherein the compressive strength of the vessel is primarily provided by a multiplicity of non-metallic ceramic blocks of refractory material which comprise components of the hull or shell of the vessel.

A submersible vessel, such as a submarine, is ordinarily provided with a steel hull or shell to enable the vessel to withstand pressures encountered at depths in the water to which the vessel may safely submerge while retaining its requisite buoyancy. The weight of the steel in the shell of a submersible vessel is a factor limiting the depth to which such a vessel may be safely submerged. In the latter respect, if the vessel is to be constructed so as to descend to greater depths, the thickness of the steel in the vessel shell must be increased to enable the shell to withstand the increased water pressure incident thereon. As the thickness of the steel in the vessel shell increases, the buoyancy of the vessel is reduced because of the weight of the added amount of steel. The thickness of the steel in the vessel shell cannot be so great as to destroy the requisite buoyancy of the vessel. Thus, the depth to which a particular submersible vessel having a steel shell may descend is limited, since the thickness of the steel in the vessel shell which would be necessary to withstand the water pressure at deep ocean depths, for example, would cause the vessel to be so heavy that it would have no buoyancy and could not rise to the surface of the water.

It is known that certain ceramic refractory materials which are significantly lighter in weight than steel exhibit a higher degree of compressive strength and a higher modulus of elasticity than steel. Among such ceramic refractory materials are the carbides, borides, nitrides, and oxides, particularly of the transition metals of the 3rd, 4th, 5th, and 6th groups of the periodic table of chemical elements.

However, such ceramic refractory materials are of a highly brittle nature. Moreover, fabrication difficulties are encountered when it is attempted to form large integral bodies of such ceramic refractory materials. In the latter respect, these materials are powder-like in raw form and must be generally compression molded at extremely high pressures (of the order of 30,000 lbs./in.$^2$) and subsequently sintered to produce unitary bodies thereof. Consequently, for practical purposes, these ceramic refractory materials are available in unitary form only as bodies of comparatively small sizes. The foregoing characteristics of these ceramic refractory materials have caused such materials to be generally regarded as unsuitable for forming the shell of a submersible vessel against which the compressive force of water pressure is directed despite their relative lightness in weight and their higher compressive strength as compared to steel.

It is an object of the present invention to provide a submersible vessel capable of safely descending to depths in a body of water which are not attainable by comparable submersible vessels of conventional steel shell construction, wherein a major portion of the shell of the submersible vessel in accordance with the present invention comprises a multiplicity of relatively lightweight ceramic blocks of refractory material having a higher degree of compressive strength than steel.

It is another object of the present invention to provide a submersible vessel comprising a shell, the major portion of which is defined by a multiplicity of ceramic blocks of refractory material arranged in juxtaposition to each other to describe a surface of revolution, wherein a layer of malleable material is interposed between adjacent ceramic blocks to equalize the pressure distribution of the water pressure to which the shell will be subjected across the surfaces of the ceramic blocks.

It is another object of the present invention to provide a submersible vessel comprising a shell having the major portion thereof formed as a surface of revolution and including a multiplicity of ceramic blocks of refractory material arranged in circumferential sections disposed in juxtaposed coaxial relationship such that the ceramic blocks of refractory material are primarily responsible for the compressive strength of the vessel, with a layer of malleable material being interposed between adjacent ceramic blocks to equalize the pressure distribution of the water pressure to which the shell will be subjected across the surfaces of the ceramic blocks, and tie rods extending longitudinally and circumferentially through the ceramic blocks to retain the portion of the shell formed thereby in assembled relation while withstanding tensional stresses to which the vessel may be subjected. In this way, the compressive strength of the submersible vessel may be increased considerably over that attainable by submersible vessels having steel shell constructions without destroying the requisite buoyancy of the vessel, thereby enabling the vessel to be safely submerged at extreme depths in a body of water.

Some of the objects of the invention having been stated, other objects will become apparent as the specification proceeds when taken together with the accompanying drawings, in which:

FIG. 1 is a partially cut-away perspective view of a submersible vessel constructed in accordance with the present invention, with an outer water-tight sheath being removed from the left-hand portion of the vessel to expose an inner portion of the vessel shell, and the vessel shell being shown in transverse section in the right-hand portion of the vessel for purposes of clarity;

FIG. 2 is an enlarged fragmentary sectional view taken along the line 2—2 of FIG. 1;

FIG. 3 is an enlarged sectional view taken along the line 3—3 of FIG. 1;

FIG. 4 is an enlarged sectional view taken along the line 4—4 of FIG. 1; and

FIG. 5 is an enlarged fragmentary transverse sectional view of a modified form of the vessel shell in accordance with the invention.

Referring more specifically to the drawings, the submersible vessel in accordance with this invention comprises a hollow hull or shell which is indicated generally by reference numeral 10. As shown in FIG. 1, the vessel shell 10 is generally cylindrical and is provided with end closures 11, 12 which are hemi-spherical in shape. Entrance and egress into and out of the shell 10 may be provided by suitable means, such as a hatch 13 on the shell 10 disposed medially of its ends. The submersible vessel as illustrated in FIG. 1 may be of a type suitable for containing various instruments, signalling devices, or the like so that it would be desirable to hold the vessel on the bottom of a body of water or at any desired depth in the water by an anchor. To this end, the shell 10 is provided with eyelets 14, 15, respectively located adjacent the bow and stern of the shell 10, which are adapted to receive lines L therethrough for securing an anchor (not shown) to the shell 10. A suitable signal-operated mechanism (not shown) could be provided for releasing the anchor from the lines L upon its actuation. It will be understood that the generally cylindrical shape of the shell 10 which has been illustrated and described may be changed without departing from the spirit of the invention, provided the shell 10 is formed as a surface of revolution except for appropriate appendages included therein, such as the hatch 13.

The hollow shell 10 is defined by a multiplicity of juxtaposed blocks or stones 16 which are arranged in a plurality of circumferential sections disposed in coaxial relationship. Each of the circumferential sections comprises a plurality of blocks 16 forming an endless perimeter, wherein the individual blocks 16 of the circumferential section are of arcuate form such that the individual blocks 16 of the circumferential section provide mutual support for each other against external compressive forces in the manner of components of an "arch." At least the majority of the blocks 16 are ceramic, being made of sintered refractory material having a relatively light weight and an equal or higher compressive strength as compared to steel. Among materials suitable for the blocks 16 are the carbides, borides, nitrides, and oxides—particularly of the 3rd, 4th, 5th, and 6th groups of the transition metals of the periodic table. As specific examples, the ceramic blocks 16 may be made of titanium carbide or boron carbide. The juxtaposed blocks 16 defining the shell 10 are primarily responsible for the compressive strength thereof.

The hemi-spherical end closures 11, 12 for the shell 10 are also defined by the blocks 16, as shown. In this instance, the blocks 16 are appropriately shaped in arcuate forms to continue the circumferential sections of the shell 10, wherein the circumferential sections defining the respective end closures 11, 12 are outwardly tapered toward the ends of the vessel, with the individual blocks 16 in each outwardly tapered circumferential section of the respective end closures 11, 12 providing mutual support for each other against external compressive forces. The end closures 11, 12 may also be formed as surfaces of revolution other than a hemisphere where the blocks 16 define the end closures 11, 12. It will be understood, however, that the end closures 11, 12 could be formed as flat plates or bulkheads of steel or other metals within the spirit of this invention. In the latter respect, the weight of the steel bulkheads acting as end closures for the shell 10 would be offset by the relatively light weight of the multiplicity of blocks 16 comprising the shell 10 itself so that buoyancy would be retained by the vessel. By using steel bulkheads as the end closures for the shell 10, the fabrication of blocks 16 in variant shapes and sizes required to form the hemi-spherical end closures 11, 12 would not be necessary.

The sintered refractory material of which the ceramic blocks 16 are made has a highly brittle nature such that irregularities in the surfaces of the ceramic blocks 16 and extreme uneven pressure distribution of water pressure across the external surface of the vessel could result in cracking and chipping of the ceramic blocks 16 ultimately causing failure of the vessel shell 10. To compensate for this troublesome characteristic of the sintered refractory material, one or more layers 17 of a thin sheet of malleable material are interposed between adjacent surfaces of adjoining ceramic blocks 16. The malleable layers 17 accommodate surface irregularities on the ceramic blocks 16 and serve to substantially equalize the pressure distribution over the surfaces of the blocks 16. The malleable layers 17 may comprise aluminum foil or other suitable material.

Means are provided to retain the multiplicity of blocks 16, the malleable layers 17, and the end closures 11, 12 in assembled relation and to provide the vessel with strength to withstand tensional stresses to which it may be subjected. To this end, the shell 10 and its hemi-spherical end closures 11, 12 are assembled on a framework which comprises a plurality of longitudinal rods or cables 18 extending between endless frame members 19 at each end of the shell 10 and secured thereto by suitable means, such as threaded nuts 20. The framework includes a plurality of arcuate rod or cable extensions 21 at the opposite ends of the rods 18 and corresponding thereto, the arcuate rod extensions 21 having inturned end portions at one end thereof forming hooks 22 which are attached to the respective endless frame members 19 and being secured at their other ends to respective fittings 23 at the bow and stern of the vessel to provide the supporting framework portion for the end closures 11, 12. The rods 18 extend through aligned holes in the ceramic blocks 16 and the malleable layers 17 interposed therebetween and apply a tensile force to the blocks 16 comprising the shell 10 clamping the blocks 16 together with the malleable layers 17 sandwiched between adjoining blocks 16. The arcuate rod extensions 21 are disposed in peripheral grooves provided in the outer surfaces of the blocks 16 defining the end closures 11, 12 which the arcuate rod extensions 21 overlie so that the arcuate rod extensions 21 are substantially flush with the outer surfaces of the blocks 16. The arcuate rod extensions 21 likewise apply a tensile force to the blocks 16 comprising the end closures 11, 12 clamping the blocks 16 together with the malleable layers 17 sandwiched between adjoining blocks 16.

The framework further comprises a plurality of circumferential arcuate rods or cables 24 disposed at spaced positions along the shell 10 between its opposite ends. The arcuate rods 24 apply a radially inwardly exerted stress to the shell 10, being respectively disposed in peripheral grooves 25 (FIGS. 2 and 3) provided in the outer surfaces of the blocks 16 which they overlie. Each of the arcuate rods 24 may be tightened by suitable means, such as a turnbuckle 26 connected between the respective ends of the rod 24.

The shell 10 and its end closures 11, 12 are covered by a water-tight sheath or skin 27 of suitable material, which may be sheet metal, such as aluminum, or resin-impregnated fiberglass, for example. It will be understood that the water-tight outer sheath 27 may cover only the shell 10 where the end closures 11, 12 comprise flat steel bulkheads. Preferably, an elastomeric layer 28 of suitable material, such as polyurethane is interposed between the sheath 27 and the outer surfaces of the blocks 16 to fill any voids therebetween. The elastomeric layer 28 maintains adherence between the sheath 27 and the blocks 16, although small surface variations may develop between the sheath 27 and the underlying blocks 16 under extreme water pressures encountered by the vessel when it descends to great depths.

The hatch 13 shown in detail in FIG. 4 comprises a metallic body 29 which is shaped to merge adjacent blocks 16 in conforming relation. The metallic body 29 is preferably steel and has a thickness sufficient to provide the requisite compressive strength for the shell 10 of the vessel of which it is a part. The metallic body 29 has an integral circular wall 30 extending outwardly therefrom and from the vessel shell 10. The circular wall 30 surrounds a central opening 31 in the metallic body 29, the opening 31 tapering inwardly to provide a frustoconical seat 32 for a metallic closure member or plug 33 adapted to close the opening 31. The closure member 33 is secured in place in water-tight engagement with the seat 32 by an internally threaded annular gland member or cap 34 which is screwed onto an externally threaded portion of the circular wall 30. Thus, the closure member 33 may be removed when it is desired to gain access to the interior of the vessel. It will be understood that the hatch 13 may be of a type which can be opened from inside of the vessel where the vessel is to be manned by personnel located within its confines.

A modified form of the shell 10 for the submersible vessel is illustrated in FIG. 5. In the modified form, the shell 10 defined by the multiplicity of juxtaposed blocks 16 is provided with an inner sheath or skin 35 of suitable material, such as aluminum, for example. The inner sheath 35 is disposed in engagement with the interior surfaces of the blocks 16 and presents a smooth radially inwardly facing surface to which longitudinal frame members 36 are rigidly secured by suitable means, such as welding. The longitudinal frame members 36 extend radially inwardly within the interior of the shell 10. The frame members 36 are metallic, preferably steel, and may be used as supports to carry an engine, a fuel tank, and other necessary equipment so as to evenly distribute the weight of such components over the shell 10. The submersible vessel in accordance with the invention may therefore be a powered submarine able to withstand compressive water pressures at depths heretofore regarded as being unsafe.

By way of a specific example, a submersible vessel was constructed in accordance with this invention wherein a multiplicity of ceramic blocks were employed to form the vessel shell. The ceramic blocks were titanium carbide stones 0.375 in. thick and available under the name "Kentanium" from the Kennametal Corp., of Latrobe, Pa. These ceramic blocks were arranged in a single layer to comprise the vessel shell with two layers of aluminum foil being sandwiched between the adjacent surfaces of adjoining ceramic blocks. Each layer of aluminum foil had a thickness approximately 0.002 in. The aforesaid vessel shell successfully withstood compressive pressures up to 28,000 lb./in.$^2$ without failing or buckling. 28,000 lbs./in.$^2$ approximates the water pressure found at a depth of 60,000 feet beneath the surface of the ocean— a depth substantially greater than that which could be safely attained by submersible vessels having conventional steel shell constructions.

Certain embodiments of the invention have been described and shown herein by way of example but not as limitative of the scope of the invention, since various modifications may be made by those skilled in the art without departing from the scope of the invention as defined by the appended claims.

I claim:
1. A submersible vessel comprising
   (a) a multiplicity of blocks disposed in juxtaposed relation and defining a hollow shell portion having an outer surface describing a surface of revolution, at least the majority of said blocks being of non-metallic material,
   (b) malleable layer means interposed between adjoining blocks and preventing direct touching therebetween for equalizing pressure distribution over the surfaces of said blocks,
   (c) a pair of end closure means respectively closing the opposite ends of said shell portion defined by said multiplicity of blocks, said end closure means and said multiplicity of blocks cooperating to form a hollow shell, and
   (d) means retaining said multiplicity of blocks, said malleable layer means, and said end closure means in assembled relation.
2. A submersible vessel as defined in claim 1, further including
   (a) a water-tight sheath covering at least the outer surface of said shell portion defined by said multiplicity of blocks.
3. A submersible vessel as defined in claim 1, wherein
   (a) said non-metallic blocks are made of ceramic refractory material having a higher compressive strength and a lower specific gravity than steel.
4. A submersible vessel as defined in claim 3, wherein
   (a) said malleable layer means comprises metallic foil.
5. A submersible vessel as defined in claim 3, wherein
   (a) said ceramic refractory material of which said non-metallic blocks are made comprises titanium carbide.
6. A submersible vessel as defined in claim 3, wherein
   (a) said ceramic refractory material of which said non-metallic blocks are made comprises boron carbide.
7. A submersible vessel comprising
   (a) a multiplicity of blocks arranged in a plurality of circumferential sections disposed in coaxial relationship, each of said circumferential sections including a plurality of arcuate blocks forming an endless perimeter, said plurality of circumferential sections defining a hollow shell portion having an outer surface describing a surface of revolution, at least the majority of said blocks being of non-metallic material,
   (b) said arcuate blocks in each of said circumferential sections being arranged in an end-to-end relationship such that the individual blocks in each of said circumferential sections provide mutual support for each other against external compressive forces and the arcuate blocks of adjacent circumferential sections are disposed in side-by-side relationship,
   (c) malleable layer means interposed between adjoining blocks and preventing direct touching therebetween for equalizing pressure distribution over the surfaces of said blocks,
   (d) a pair of end closure means respectively closing the opposite ends of said shell portion,
   (e) means retaining said multiplicity of blocks, said malleable layer means, and said end closure means in assembled relation, and
   (f) a water-tight sheath covering at least the outer surface of said shell portion defined by said plurality of circumferential sections.
8. A submersible vessel as defined in claim 7, wherein
   (a) each of said pair of end closure means comprises a plurality of blocks disposed in juxtaposed relation and defining an outer surface describing a surface of revolution, at least the majority of said blocks comprising said pair of end closure means being of non-metallic material,
   (b) said blocks comprising said pair of end closure means being arranged in respective outwardly tapering circumferential sections disposed in coaxial relationship and continuing the circumferential sections of the shell portion at each end thereof, each of said outwardly tapering circumferential sections including a plurality of arcuate blocks forming an endless perimeter,
   (c) said arcuate blocks in each of said outwardly tapering circumferential sections being arranged in an end-to-end relationship such that the individual blocks in each of said outwardly tapering circumferential sections provide mutual support for each other against external compressive forces, and
   (d) malleable layer means interposed between adjoining blocks of said plurality of blocks comprising said pair of end closure means and preventing direct touching therebetween for equalizing pressure distribution over the surfaces of said pair of end closure means.
9. A submersible vessel as defined in claim 7, further including
   (a) a layer of elastomeric material between the outer surface of said shell portion and said sheath adhering said multiplicity of blocks to said sheath and filling voids therebetween.
10. A submersible vessel as defined in claim 9, further including
   (a) a second sheath covering the interior surface of said shell portion and being in engagement with the interior surfaces of said multiplicity of blocks.
11. A submersible vessel comprising
   (a) a multiplicity of blocks arranged in a plurality of circumferential sections disposed in coaxial relationship, each of said circumferential sections including a plurality of arcuate blocks forming an endless perimeter, said plurality of circumferential sections defining a hollow shell portion having an outer surface describing a surface of revolution, at least the majority of said blocks being of ceramic refractory mate- rial having a higher compressive strength and a lower specific gravity than steel, (b) said arcuate blocks in each of said circumferential sections being arranged in an end-to-end relationship such that the individual blocks in each of said circumferential sections provide mutual support for each other against external compressive forces and the arcuate blocks of adjacent circumferential sections are disposed in side-by-side relationship, (c) a layer of malleable metallic foil interposed between adjoining blocks and preventing direct touching therebetween for equalizing pressure distribution over the surfaces of said blocks and for accommodating irregularities in adjacent surfaces of adjoining blocks, (d) a pair of end closures respectively closing the opposite ends of said shell portion defined by said circumferential sections of blocks, said end closures and said multiplicity of blocks cooperating to form a hollow shell, (e) means retaining said multiplicity of blocks, said layers of malleable metallic foil, and said closures in assembled relation, and (f) a water-tight sheath covering at least the outer surface of said shell portion defined by said circumferential sections of blocks.

12. A submersible vessel as defined in claim 11, wherein said retaining means includes (a) a plurality of longitudinal rods disposed parallel to the axis of the hollow shell portion and extending through said blocks and said layers of malleable metallic foil between adjoining blocks, and (b) means connected to the opposite ends of said rods clamping said blocks in said hollow shell portion together with said layers of malleable metallic foil interposed therebetween.

13. A submersible vessel as defined in claim 11, wherein said retaining means includes (a) a plurality of longitudinal rods disposed parallel to the axis of the hollow shell and extending through said blocks and said layers of malleable metallic foil between adjoining blocks, (b) means connected to the opposite ends of said rods clamping said blocks in said hollow shell portion together with said layers of malleable metallic foil interposed therebetween, (c) a plurality of circumferential rods disposed at spaced positions along the length of said shell portion and encircling respective circumferential sections of blocks, and (d) means to tighten said circumferential rods about the blocks lying therebeneath.

14. In a submersible vessel, (a) a multiplicity of blocks arranged in a plurality of circumferential sections disposed in coaxial relationship, each of said circumferential sections including a plurality of arcuate blocks forming an endless perimeter, said plurality of circumferential sections defining a hollow shell portion having an outer surface describing a surface of revolution, (b) said arcuate blocks in each of said circumferential sections being arranged in an end-to-end relationship such that the individual blocks in each of said circumferential sections provide mutual support for each other against external compressive forces and the arcuate blocks of adjacent circumferential sections are disposed in side-by-side relationship, and (c) means retaining said multiplicity of said blocks in assembled relationship.

15. In a submersible vessel as defined in claim 14, wherein (a) at least the majority of said blocks are made of ceramic refractory material having a higher compressive strength and a lower specific gravity than steel.

16. In a submersible vessel as defined in claim 15, further including (a) malleable layer means interposed between adjoining blocks wherein at least one of such adjoining blocks is made of ceramic refractory material and preventing direct touching therebetween for equalizing pressure distribution over the surfaces of said blocks.

References Cited
UNITED STATES PATENTS

| | | | |
|---|---|---|---|
| 3,029,966 | 4/1962 | Reynolds | 220—5 |
| 3,115,982 | 12/1963 | Morrison | 220—4 XR |
| 3,228,550 | 1/1966 | Krenzke | 220—63 XR |
| 3,256,069 | 6/1966 | Peterson | 220—3 XR |

THERON E. CONDON, *Primary Examiner.*

GEORGE E. LOWRANCE, *Examiner.*